(12) United States Patent  
Contreras et al.

(10) Patent No.: US 9,275,664 B2  
(45) Date of Patent: Mar. 1, 2016

(54) SHIELDED FLEX CABLE FOR USE IN A DISK DRIVE

(71) Applicant: HGST Netherlands B.V., Amsterdam (NL)

(72) Inventors: John Contreras, Palo Alto, CA (US); Nobumasa Nishiyama, Yokohama (JP); Albert Wallash, Morgan Hill, CA (US)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 14/106,308

(22) Filed: Dec. 13, 2013

(65) Prior Publication Data  
US 2015/0170690 A1  Jun. 18, 2015

(51) Int. Cl.  
G11B 5/48  (2006.01)

(52) U.S. Cl.  
CPC .............. G11B 5/4846 (2013.01); G11B 5/486 (2013.01)

(58) Field of Classification Search  
CPC ...... G11B 5/486; G11B 5/4853; G11B 5/4846  
USPC ............. 360/245.8, 245.9, 246, 264.2, 266.3, 360/99.25  
See application file for complete search history.

(56) References Cited

U.S. PATENT DOCUMENTS

| 5,095,396 | A | 3/1992 | Putnam et al. |
| 5,241,436 | A | 8/1993 | Kawabata et al. |
| 5,552,950 | A | 9/1996 | Coffey et al. |
| 5,694,270 | A | 12/1997 | Sone et al. |
| 5,717,547 | A | 2/1998 | Young |
| 5,737,152 | A | 4/1998 | Balakrishnan |
| 5,754,369 | A | 5/1998 | Balakrishnan |
| 5,812,344 | A | 9/1998 | Balakrishnan |
| 5,995,328 | A | 11/1999 | Balakrishnan |
| 6,111,203 | A | 8/2000 | Cheng et al. |
| 6,836,390 | B2 | 12/2004 | Shin et al. |
| 6,839,202 | B2 | 1/2005 | Zhou |
| 7,271,985 | B1 | 9/2007 | Buhler et al. |
| 7,952,834 | B2 | 5/2011 | Freeman et al. |
| 8,233,287 | B2 | 7/2012 | Cayaban et al. |
| 8,310,789 | B2 | 11/2012 | Contreras et al. |
| 8,385,023 | B2 | 2/2013 | Abdul Razak |
| 2004/0252413 | A1* | 12/2004 | Nishiyama ................. 360/245.9 |
| 2007/0133128 | A1* | 6/2007 | Arai .......................... 360/245.9 |
| 2007/0230004 | A1 | 10/2007 | Yen |
| 2007/0230059 | A1* | 10/2007 | Ota et al. ................... 360/245.9 |
| 2009/0025217 | A1* | 1/2009 | Kamei ........................... 29/847 |
| 2010/0128397 | A1* | 5/2010 | Contreras et al. ............ 360/244 |
| 2011/0090602 | A1* | 4/2011 | Nishiyama et al. ........ 360/246.4 |
| 2012/0160538 | A1 | 6/2012 | Contreras et al. |
| 2013/0128387 | A1* | 5/2013 | Ajioka et al. .............. 360/245.2 |

* cited by examiner

Primary Examiner — Craig A. Renner  
(74) Attorney, Agent, or Firm — G. Marlin Knight

(57) ABSTRACT

A flex cable with a shielding layer for use in a disk drive is described. The flex cable connects the actuator to the system electronics. The flex cable has a shielding layer that provides RF shielding for the embedded signal traces. In embodiments the shielding layer is connected to the baseplate or device enclosure ground at one or more selected points on the bracket end of the flex cable that are separated from the signal paths. Embodiments of the shielding layer include rows of apertures or windows that are aligned with selected signal traces such as the read and write signal traces and serve to maintain the desired impedance in the read and write signal traces. In one embodiment the shielding layer extends over a selected portion of the flex cable that includes the bracket end and the area under the first stiffener.

10 Claims, 4 Drawing Sheets

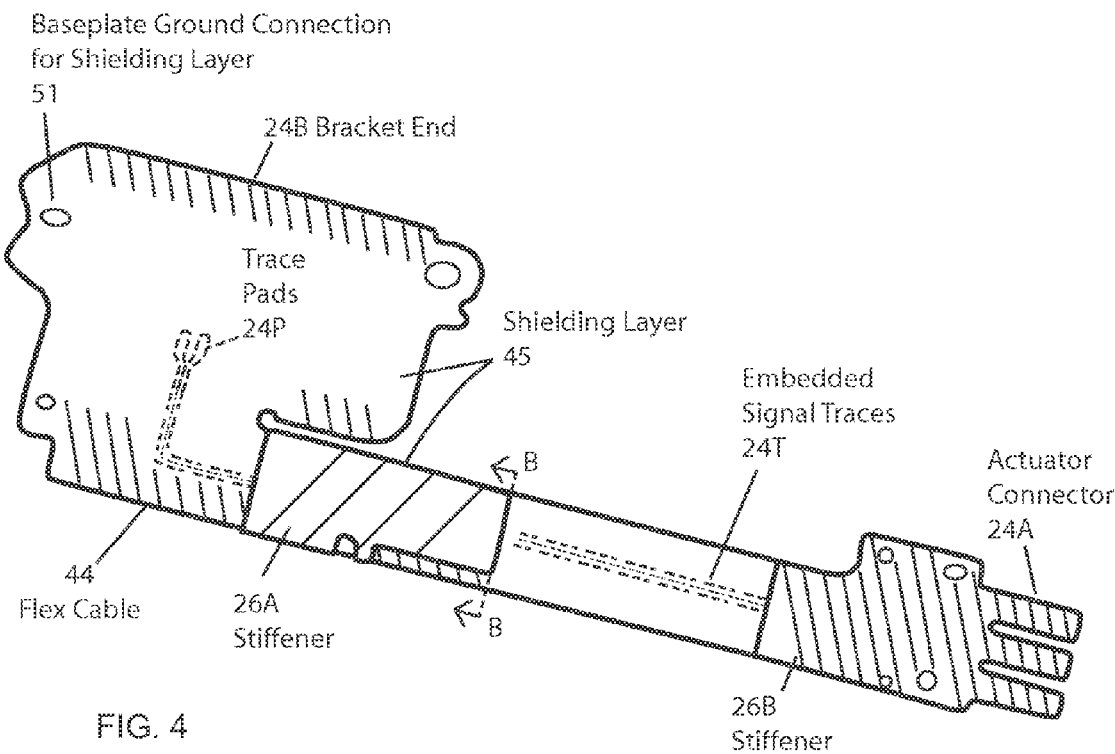
FIG. 4
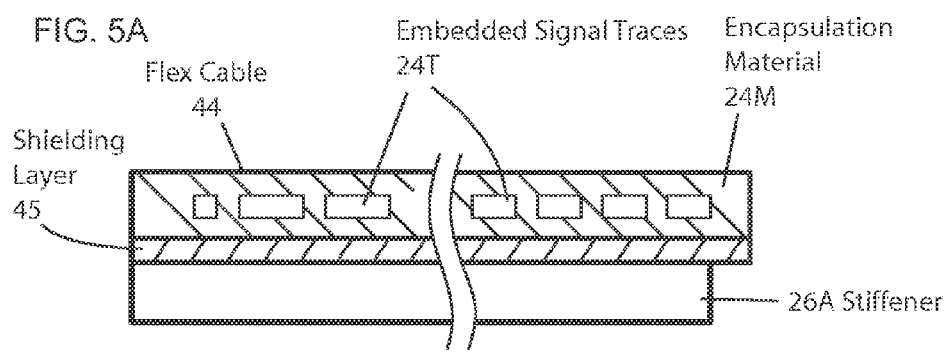
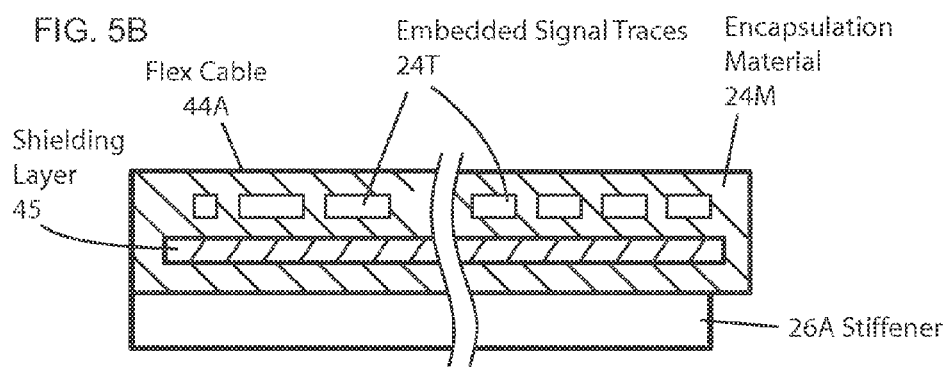

SHIELDED FLEX CABLE FOR USE IN A DISK DRIVE

FIELD OF THE INVENTION

Embodiments of the invention relate to the design of flexible signal cables for use in disk drives and more particularly to techniques for shielding such flexible signal cables from interference from electromagnetic noise.

BACKGROUND

FIG. 1 is an illustration of selected components of a disk drive 10 according to the prior art. The disk drive includes at least one magnetic recording disk 12 that rotates on spindle 13 in direction 15 driven by a spindle motor (not shown). Housing or baseplate 16 provides support for the components. The upper portion of the outer protective case, which is present for normal operation, is removed for this illustration. The data is recorded concentric or spiral, generally circular data tracks 50, only a small portion of which are shown. In practice there are thousands of tracks that extend 360 degrees around the disk. The disk drive includes actuator 14 pivots on pivot point 17 driven by a rotary voice coil motor (VCM) (not shown). The actuator 14 includes a rigid actuator arm 18. A flexible wiring cable 24, which is usually called the "flex cable," connects the devices on the actuator including read and write heads (not shown) in the slider 22 and the read/write integrated circuit chip (R/W IC) (not shown) to the drive's electronics (not shown). The R/W IC is typically mounted on the actuator arm or can be integrated into the flexible wiring cable, which is usually called the "flex cable." A flexible suspension 20 includes a flexure element (not shown) and is attached to the end of arm 18. Air-bearing slider 22 contains the read/write heads (not shown). As the disk 12 rotates, the slider with read/write heads is positioned over a track to read and write the magnetic transitions. The read head also detects the angularly spaced servo sectors 60 in the data tracks. Only two of the many servo sectors 60 are shown for simplicity.

Disk drives often have more than one disk mounted on the spindle and the upper and lower surfaces of each disk can have magnetic recording material thereon, and the actuators with components mounted thereon are replicated as needed to access each of the recording surfaces.

The flex cable 24 provides electrical connections between the actuators and the drive electronics on a circuit board (not shown). The flex cable 24 is rigidly attached by stationary bracket 23 at one end, which connects to drive electronics. The other end of the flex cable is attached to the set of actuators 14 which move in unison in response to the VCM. In the example shown in FIG. 1, a stiffener 26A is illustrated as being part of the flex cable. The stiffener 26A, which is a thin layer of aluminum is bonded to one side the flex cable. Although only one stiffener segment is shown, another stiffener segment can be located close to the actuator as is shown in FIG. 2.

FIG. 2 is an illustration of a prior art flex cable 24 prior to being installed in a disk drive. The bracket end 24B is rigidly attached by stationary bracket 23 when installed. The trace pad area 25 provides the connections to drive electronics (not shown) for each of the plurality of embedded conductive traces 24T. Only two of the plurality of trace pads 24P are shown for simplicity. There are two stiffeners 26A, 26B in this example attached to the bottom surface of the flex cable. The stiffener 26B is located at the actuator connecter end 24A. FIG. 3 is an illustration of an section view taken along line A-A of the prior art flex cable shown in FIG. 2. A standard single-layer flex cable includes a set conductive traces 24T encapsulated inside flexible encapsulation material 24M, e.g. polyimide. The width and conducting capacity of the individual traces can vary according to requirements. The traces are typically made of copper.

SUMMARY OF THE INVENTION

Embodiments of the invention include a disk drive with a flex cable with a shielding layer for connecting the actuator to the system electronics. The flex cable has a shielding layer that provides RF shielding for the signal traces. In embodiments the shielding layer is connected to the baseplate or device enclosure ground at one or more selected points on the bracket end of the flex cable that are separated from the signal paths. The shielding layer is not connected to any of the signal traces in the flex cable. Embodiments of the shielding layer include rows of apertures or windows that are aligned with selected signal traces such as the read and write signal traces and serve to maintain the desired impedance in the read and write signal traces. In one embodiment the shielding layer extends over a selected portion of the flex cable that includes the bracket end and the area under the first stiffener.

BRIEF DESCRIPTION OF THE FIGURES

FIG. 4 is an illustration of a flex cable with shielding according to an embodiment of the invention.

FIG. 5A is an illustration of a section view of the flex cable taken along line B-B shown in FIG. 4 with shielding according to an embodiment of the invention.

FIG. 5B is an illustration of a section view of the flex cable taken along line B-B shown in FIG. 4 with shielding according to an alternative embodiment of the invention.

DETAILED DESCRIPTION OF THE INVENTION

Figure 1:
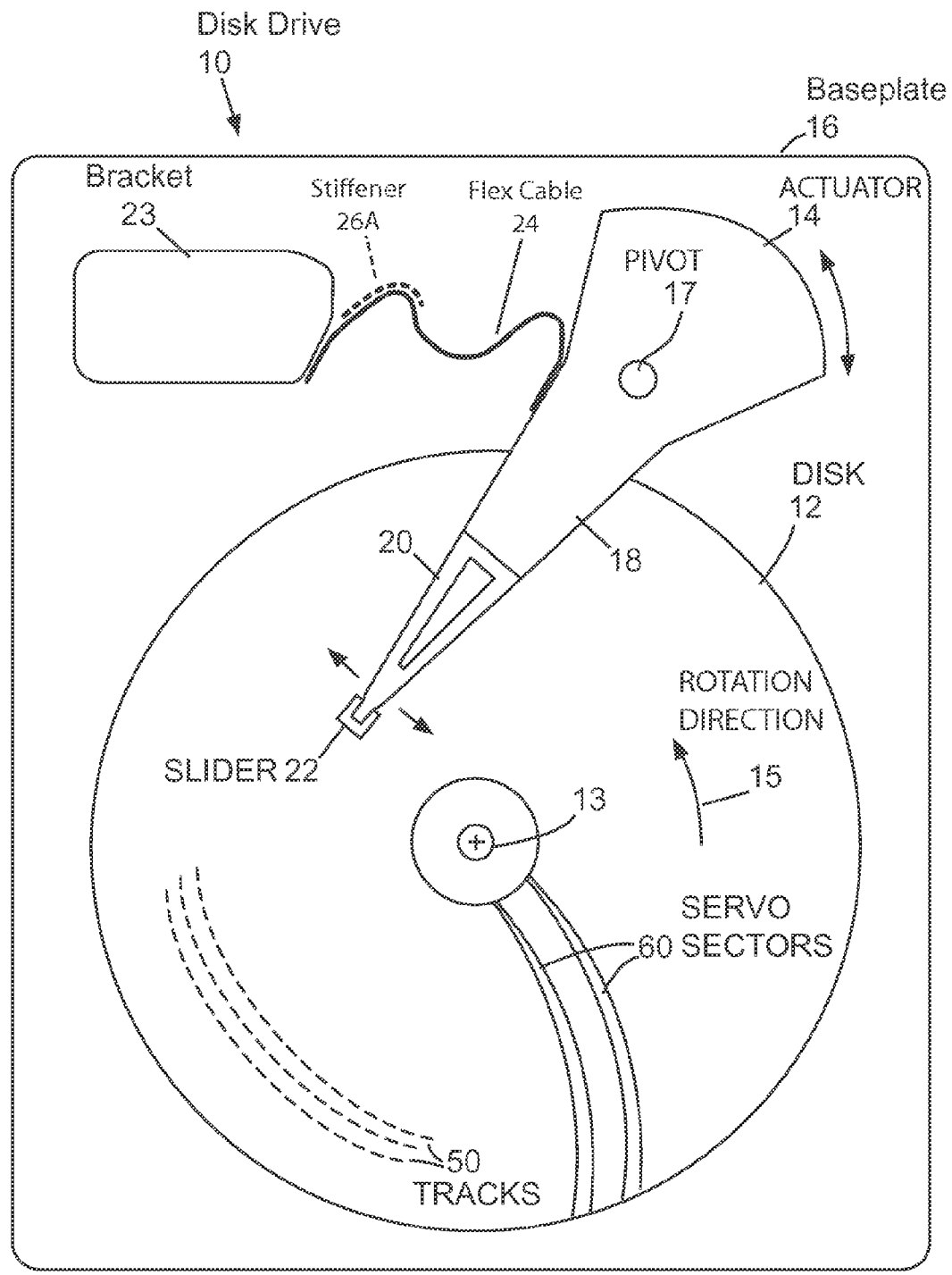
FIG. 1 is an illustration of selected components of a disk drive according to the prior art.
Figure 2:
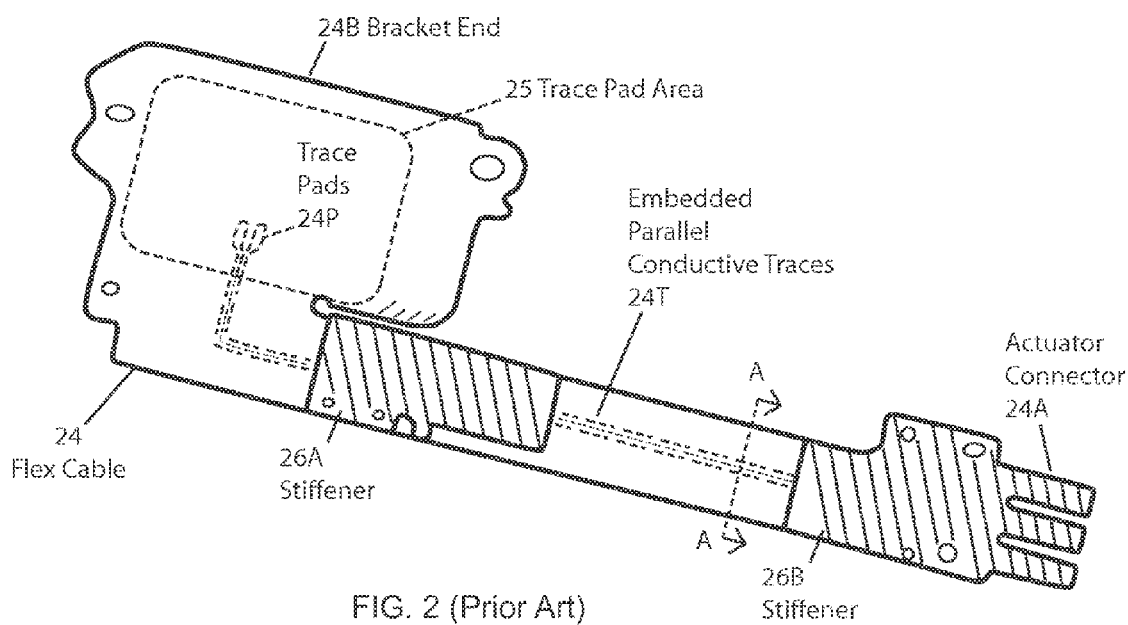
FIG. 2 is an illustration of a prior art flex cable for use in a disk drive.
Figure 3:
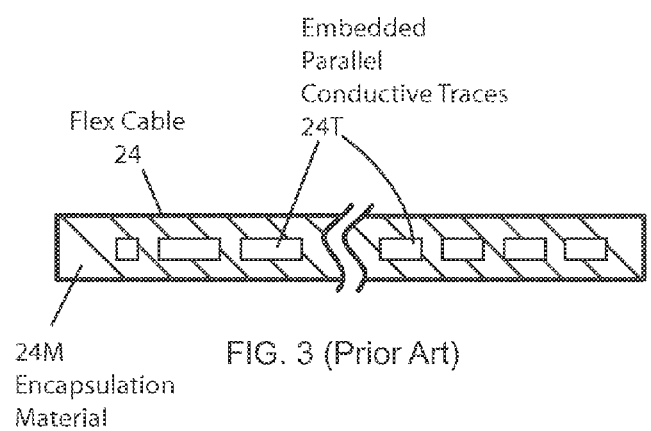
FIG. 3 is an illustration of an A-A section view of the prior art flex cable shown in FIG. 2.

Applicants have determined that a source of "radio-frequency interference" (RFI) in prior art flex cables could be traced to an ungrounded aluminum stiffener such as the stiffener 26A shown in FIGS. 1 and 2, attached to the flex cable, which coupled RFI to the traces underneath it. Electromagnetic (EM) simulations showed a strong field between the base plate and ungrounded aluminum stiffener, which indicates that a voltage difference exists between the stiffener and baseplate. This RF voltage will couple to the flex traces and result in noise in the front end and potentially cause failure during RFI testing. The traces carrying the signal from the read heads can be particularly vulnerable to RFI.

The stray RF fields couple to the unshielded copper signal traces in the flex cable and to any floating metallic stiffener mounted to the flex cable. These fields then excite a series of resonances in the flex region of the interconnection below 1 GHz. These currents can cause failure during standard testing in an anechoic chamber. Connecting the stiffener to the signal ground/return path in the flex cable is not a solution and, in fact, results in increased RFI.

One way to reduce the RFI would be to improve the shielding effectiveness of the drive enclosure to reduce the electromagnetic fields that excite these resonances. However, the lack of available space makes it very difficult to add enough screws to completely shield the inside of the disk drive and screws cannot be placed at certain key locations. Also, these types of design changes affect manufacturing processes and add material cost.

Embodiments of the invention add shielding directly onto the flex cable at the bracket end of the flex cable and under the first stiffener to reduce the RF fields seen by the flex traces and reduce the excitation of any flex resonances. This was accomplished by adding a shielding layer as a second conductive layer at the bracket end 24B of the flex cable.

FIG. 4 is an illustration of a flex cable 44 with shielding according to an embodiment of the invention. FIG. 5A shows a cross-sectional view of a flex cable 44 with a shielding layer 45 according to an embodiment of the invention. The section is taken along line B-B shown in FIG. 4. The shielding layer 45 is placed between the floating conductive stiffener 26A and the embedded conductive signal traces 24T in order to shield the signal lines from RFI caused by the stiffener. The shielding layer 45 is preferably made of copper and should have a thickness greater than the skin depth at the expected RFI frequencies. Thus, as an example, assuming an RFI frequency of about 1 GHz, a thickness of 10 microns of copper is adequate to achieve the effective shielding.

The conductive signal traces 24T are embedded in encapsulation material 24M such as polyimide as described in the prior art. The shielding layer 45 can be embedded in the encapsulation material as shown in FIG. 5B in flex cable 44A. The set of traces will be called signal traces for simplicity but the conductive traces also supply power and include various control signals. Only a subset of the signal traces 24T that would exist in a practical flex cable are shown for simplicity. For example, more than 10 traces might be needed for each slider in a disk drive.

Figure 6:
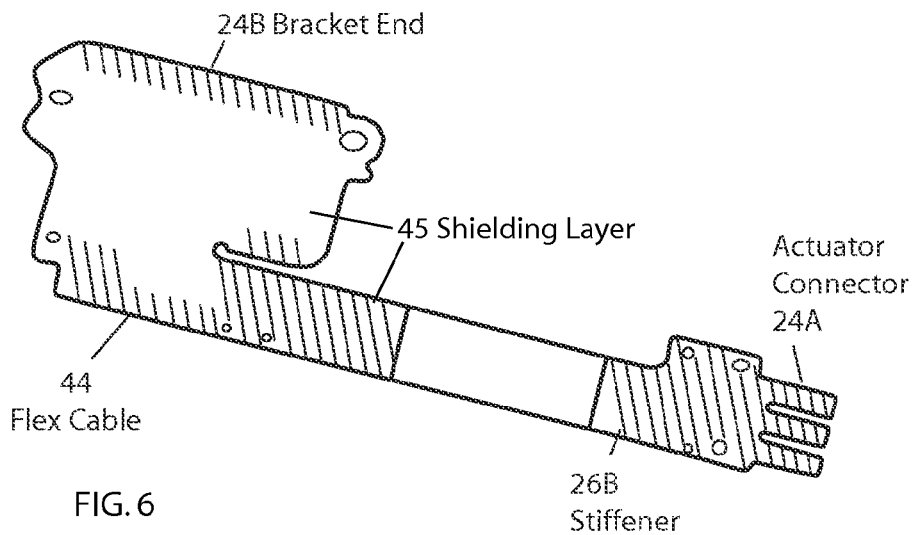
FIG. 6 is an illustration of a flex cable with shielding according to an embodiment of the invention with components removed to illustrate the selected portion of the flex cable over which the shielding extends.

In this embodiment the shielding layer 45 extends only over a selected portion of the flex cable that includes the entire trace pad area at the bracket end and then ends approximately at the end of the stiffener 26A, i.e. at line B-B. FIG. 6 is an illustration of the extent of the shielding layer 45 in a flex cable 44 as described above with all components and materials above the shielding layer 45 removed for purposes of illustration. In alternative embodiments the shielding layer could be extended to cover substantially all of the flex cable with a potential tradeoff of reduced flexibility on the actuator end.

Important design considerations that need to be taken into account when adding this dual layer will be discussed below. In order for the dual-layer flex cable design to provide the needed shielding, correct grounding of the shielding layer must accomplished. The shielding layer must be grounded to the baseplate or device enclosure in order to direct the RF noise current away from the signal traces in the flex cable. It is important to keep the grounding of the shield layer separate from the signal ground/return. Experiments and simulations showed that the shielding layer functioned correctly when electrically connected at one point directly to the baseplate or disk enclosure, which can be done at the bracket end of cable. This design directs the RF noise current away from the signal ground/return traces embedded in the flex cable, and does not "contaminate" the signal and ground traces with noise, which could make the RF interference worse. The shield layer forms an RFI ground plane that is connected to the baseplate or disk enclosure to shunt RFI interference away from the sensitive signal traces. The read signal traces are the most sensitive in current disk drive designs, but the shielding extends across all of the traces in this embodiment.

One convenient area for making the baseplate ground connection 51 for the shield layer is shown in FIG. 5 at the far end of the flex cable. Other baseplate ground connection points are also possible and multiple baseplate ground connection points can also be used as long as the principle of avoiding interference with the signal paths is observed.

Another design consideration for the flex cable with a shielding layer is the potential adverse effect on the impedance of the write and read traces. Placing a continuous conductive layer under the write and read traces in the flex cable potentially alters their impedance. For example, in certain embodiments, it is important to keep the differential impedance of the write and read traces close to 100 ohms, to preserve signal integrity. Placing a continuous conductive layer under the write and read traces in the flex cable would reduce their impedance below the optimal 100 ohm. Therefore, embodiments of the invention include a pattern of windows in the shielding layer positioned under the read and write traces of selected size and spacing such that the differential impedance was maintained at the desired 100 ohms.

Figure 7:
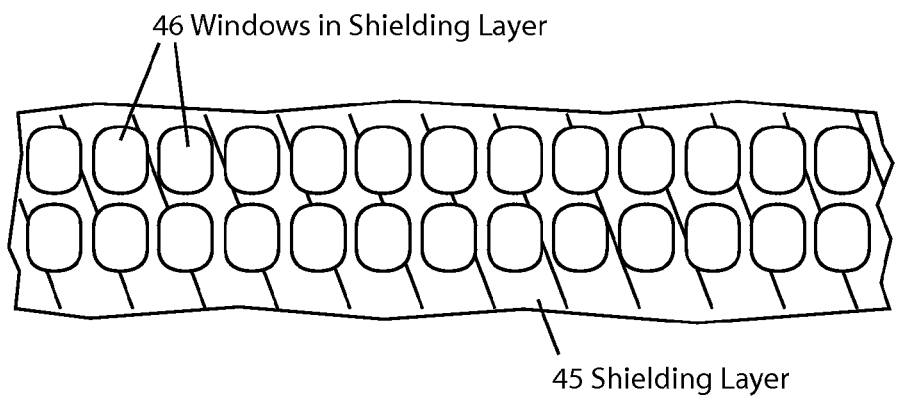
FIG. 7 is an illustration of a plan view of a section of the shielding for the flex cable illustrating the pattern of windows in the shielding according to an embodiment of the invention.
Figure 8:
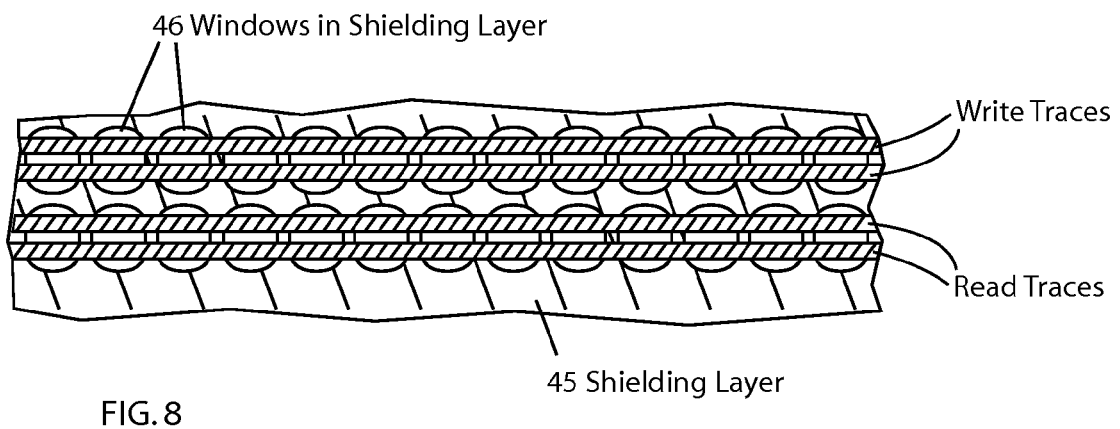
FIG. 8 is an illustration of a plan view of a section of the shielding for the flex cable illustrating the pattern of windows in the shielding in alignment with the read and write traces embedded in the flex cable according to an embodiment of the invention.

Therefore, embodiments of the shielding layer include a pattern of apertures or windows formed to control the impedance of the signal traces, while preserving the RFI ground plane for RFI immunity. FIG. 7 is an illustration of a plan view of a selected section of the shielding layer for the flex cable illustrating the pattern of windows in the shielding according to an embodiment of the invention. The apertures or windows in this embodiment have a rectangular shape with rounded corners, but other shapes can be used as well. Only two rows of windows 46 are shown, but multiple rows of windows can be used be present as will be further described. The particular shape, size and spacing of the windows can vary with the application. FIG. 8 is an illustration of a plan view of a selected section of the shielding for the flex cable illustrating the pattern of windows in the shielding in alignment with a set of read and write traces embedded in the flex cable according to an embodiment of the invention. As shown the upper row of windows is positioned in alignment with the pair of write traces, and the lower row of windows is positioned in alignment with the pair of read traces. In one embodiment as an example, there could be two parallel rows of windows for the set of traces for each slider in the disk drive. In addition, rows of windows could also be used for any of the other signal or control traces whose impedance could be adversely affected by having continuous shielding positioned adjacent to them.

The invention claimed is:
1. A disk drive comprising:
a baseplate;
a disk rotatably mounted on a spindle attached to the baseplate;
system electronics attached to the baseplate;
a stationary bracket having electrical connections to the system electronics and being attached to the baseplate;
a pivoting actuator that includes a rigid arm mounted on a pivot point and a flexible suspension attached to the rigid arm with a slider mounted on the flexible suspension so that the slider is selectably positionable over the disk by pivoting movement of the actuator; and a flexible wiring cable connecting the pivoting actuator to the system electronics through the stationary bracket, the flexible wiring cable having first and second ends and being attached to the stationary bracket at the first end and being attached to the pivoting actuator at the second end, the flexible wiring cable having a set of conductive signal traces that are encapsulated inside flexible encapsulation material and are connected to the system electronics and include a signal return trace and a shielding layer of conductive material extending over at least a selected portion of the flexible wiring cable that includes the first end which is attached the stationary bracket, the shielding layer being electrically isolated from the set of conductive signal traces and being electrically connected to the baseplate to provide radio-frequency interference shielding for the set of conductive signal traces.

2. The disk drive of claim 1 wherein the shielding layer includes at least one row of windows that are aligned with a selected signal trace.

3. The disk drive of claim 1 wherein the shielding layer includes at least first and second rows of windows with each row including a plurality of windows arranged in a selected pattern and wherein the first row of windows is aligned with a pair of signal traces for a write signal and the second row of windows is aligned with a pair of signal traces for a read signal.

4. The disk drive of claim 3 wherein the selected pattern of windows contributes to an impedance of the pair of signal traces for the read signal.

5. The disk drive of claim 3 wherein the impedance of the pair of signal traces for the read signal is approximately 100 ohms.

6. The disk drive of claim 1 wherein the shielding layer extends over the selected portion of the flexible wiring cable that includes the first end, a trace pad area and an area under a first stiffener that is attached to the flexible wiring cable adjacent to the stationary bracket, the shielding layer ending before reaching the second end of the flexible wiring cable that is attached to the pivoting actuator and the shielding layer having no electrical connection to the pivoting actuator.

7. The disk drive of claim 1 wherein the shielding layer extends over the selected portion of the flexible wiring cable that includes the first end, and an area under a first metallic stiffener that is attached to the flexible wiring cable adjacent to the stationary bracket, the shielding layer ending before reaching the second end of the flexible wiring cable that is attached to the pivoting actuator and the shielding layer having no electrical connection to the pivoting actuator and wherein the shielding layer provides shielding for the set of conductive signal traces from radio-frequency interference coupled by the first metallic stiffener.

8. The disk drive of claim 1 wherein the shielding layer includes at least one row of apertures that are aligned with a selected signal trace and wherein the apertures have a rectangular shape with rounded corners.

9. The disk drive of claim 1 wherein the shielding layer includes at least first and second rows of windows with each row including a plurality of windows arranged in a selected pattern, wherein the windows have a rectangular shape with rounded corners and wherein the first row of windows is aligned with a pair of signal traces for a write signal and the second row of windows is aligned with a pair of signal traces for a read signal.

10. The disk drive of claim 1 wherein the shielding layer is copper and has a thickness of approximately 10 microns.

\* \* \* \* \*